United States Patent Office 3,057,717
Patented Oct. 9, 1962

3,057,717
PROCESSING OF URANIUM-METAL-CONTAINING FUEL ELEMENTS
Raymond H. Moore, Kennewick, Wash., assignor to the United States of America as represented by the United States Atomic Energy Commission
No Drawing. Filed Apr. 20, 1961, Ser. No. 104,484
14 Claims. (Cl. 75—84.1)

This invention deals with a method of treating fuel elements or fuel material for nuclear reactors, and in particular with a method of processing metallic uranium-aluminum-alloy fuel which is enriched in $U^{233}$ and/or $U^{235}$, as it is used in power reactors or in the Materials Testing Reactor.

The process is intended for the recovery of $U^{233}$ or $U^{235}$ from flawy fuel elements, for the enrichment and recovery of uranium by its separation from fission products and possibly from plutonium.

Aqueous processes have been used for the above-described purposes; however, aqueous processes require a great many steps to obtain the uranium in concentrated or even solid form.

It is an object of this invention to provide a process for the recovery of uranium from uranium-metal-containing fuel materials of neutronic reactors in which dissolution in an aqueous medium and later concentration steps are not necessary.

It is another object of this invention to provide a method for the processing of uranium-containing fuel materials of neutronic reactors which can be carried out in small batches at the reactor site, so that the radioactive material does not have to be shipped.

It is finally also an object of this invention to provide a method for the processing of uranium-metal-containing fuel materials which does not require the addition of a moderator material, such as a solvent, for the reduction of hazards due to criticality.

Uranium-containing fuel materials have been processed by dissolving them in alkali metal-aluminum metal halides and reducing the uranium chloride formed to metallic uranium by the addition of aluminum; equimolar quantities of alkali metal halide and aluminum halide were used. This process is described in detail in U.S. Patent No. 2,948,586, granted to this inventor on August 9, 1960.

It has now been found that a considerable improvement of that method can be accomplished by restricting the addition of aluminum halide for the dissolution of the fuel to certain critical quantities. More specifically, it has been found that, if the uranium-aluminum-alloy fuel is dissolved in an alkali metal halide-aluminum halide mixture which contains just about enough aluminum halide to convert all of the uranium and fission products to the halides, but which has a radically predominant quantity, moldwise, of alkali metal halide, the uranium halide formed by reaction with the aluminum halide is strongly complexed by the alkali metal halide and consequently not reduced by the aluminum metal present; the alkali metal-uranium double halide enters the salt phase practically quantitatively. All fission products that are electronegative with respect to aluminum metal enter the aluminum metal phase, while all fission products electropositive in regard to aluminum are halogenated and also are taken up by the salt phase.

It was found, on the other hand, that in this salt phase obtained in the above-described dissolution step, after separation from the aluminum metal phase, if then made equimolar with regard to the alkali metal halide-aluminum halide "double salt" by the addition of the necessary quantity of aluminum halide, the uranium halide is converted to an aluminum-reducible halide. This may be based on the conversion of an alkali metal-uranium halide complex to uranium halide and the formation of a more stable alkali metal-aluminum halide complex.

Thus, while a separation of the uranium from electronegative fission products is accomplished in the treatment of the fuel with the alkali-metal-halide-predominant salt mixture, separation of the uranium from the electropositive fission product halides—and, if present, from plutonium halide—is accomplished from the equimolar salt by a reduction with aluminum, as will be pointed out more in detail later. These findings have been utilized for the process of this invention.

The process of this invention comprises dissolving a neutron-bombarded uranium-aluminum alloy containing fission products in a molten mixture of aluminum halide and alkali metal halide, wherein the alkali metal halide is present in radically predominant quantities as to the amount of aluminum halide and the aluminum halide is present in an about stoichiometric quantity with respect to the uranium and fission products to be halogenated; separating a metal phase containing the aluminum metal of the alloy and fission products electronegative to aluminum from a salt phase containing the fission products electropositive to aluminum and also containing an alkali metal-uranium halide; adding aluminum halide to the salt phase to bring the amount of aluminum halide to about equimolarity with regard to the alkali metal halide present; adding aluminum metal to the molten salt phase in a quantity that is several times as great as that stoichiometrically required for the reduction of the uranium halide present, whereby aluminum halide and uranium metal are formed and the uranium metal is alloyed with the excess aluminum, while the halides of the electropositive fission products remain as such in the salt phase; and separating the salt from the alloy formed.

Dissolution of the neutron-bombarded uranium-aluminum alloy is preferably carried out under cover. The mole ratio of aluminum halide to alkali metal halide in this step preferably ranges between 0.1 and 0.5. In this dissolution step the aluminum halide, it is assumed, reacts with the uranium metal to form uranium halide and the uranium halide formed then complexes with the predominant amount of potassium halide to form complexes, for instance, of the formula $KUX_4$, $KU_2X_7$ or the like, X symbolizing the halogen atom. The halides formed from fission products electropositive to aluminum follow the uranium and enter the metal phase. Thus two phases are formed in the dissolution step: a metal phase containing the aluminum metal of the alloy and fission products electronegative to aluminum and a salt phase containing the excess noncomplexed alkali metal halide, alkali metal-uranium double halide, the halides of electropositive fission products and, if it was present in the fuel, also plutonium trihalide.

The fission products usually present in neutron-bombarded fuel material and electronegative to aluminum are molybdenum, tellurium, palladium, ruthenium, zirconium and niobium. The electropositive fission products comprise the lanthanide rare earth metals; alkaline earth metals, such as strontium; and alkali metals, in particular cesium; they represent above 99.9% of the total amount of fission products usually present.

The halides suitable for the process of this invention are chlorides and bromides; the bromides have been found superior to the chlorides, as will be shown later. However, the chlorides have the advantage of lower cost.

After the dissolution step has been completed, usually after about 30 minutes, the phases are separated by any methods known to those skilled in the art. For instance, centrifuging or decanting, while the mass is above the melting temperature, has been found satisfactory. Of course, other separation methods can be used equally well. The metal phase is discarded as waste.

At this point an additional quantity of aluminum halide is added to the salt phase so that the aluminum halide and alkali metal halide are then present in about equimolar amounts. While an exactly equimolar ratio yields by far the best results during reduction with aluminum, the ratio of aluminum halide to alkali metal halide should not be outside the range of from 0.8 to 1.2; within this scope, the range of from 0.8 to 1 is preferred, because aluminum halides vaporize below the reaction temperature used for the process. With the equimolar "double salt," the reaction of uranium halide with, for instance, potassium halide is reversed, for instance, according to the equation $$KUX_4 \rightarrow UX_3 + KX$$

After equimolarity has been attained, aluminum metal is added to the salt phase. The aluminum has to be present in an excess quantity with regard to the uranium halide to be reduced and preferably is several times that stoichiometrically required for the reduction of the uranium halide; aluminum halide is formed during the reaction. The uranium metal is alloyed with the excess quantity of aluminum. The electropositive fission product halides and any plutonium halide present are not reduced by the aluminum and enter the salt phase. Thus, while in the first step a separation of uranium from the electronegative fission products is accomplished, in the reduction step a separation from the electropositive fission products and, if present, from the plutonium is brought about. As a result of these effects, a uranium metal of a particularly high degree of purity is obtained. The aluminum halide formed complexes with the potassium halide to a potassium-aluminum double halide.

The temperature for both extraction steps, that with the molten mixture predominant in potassium halide and that with the equimolar salt phase, depends to some degree on the halides used and on the composition of the alloy. A temperature range of between 600 and 1000° C., however, is satisfactory for practically all instances. Within this range a higher melting point is required for the chlorides than is for the bromides; this is one reason for preferring the bromides to the chlorides. The aluminum-uranium eutectic is at 14.8% by weight of uranium, and the melting point of the alloy containing more uranium than the eutectic increases with increasing uranium content. Generally, a temperature of about 725° C. ±25° C. is satisfactory for alloys containing from a trace of uranium to 17% by weight of uranium for chloride and bromide salt mixtures.

The uranium-aluminum alloy is then separated from the salt phase by methods known to those skilled in the art. If plutonium was present in the original fuel alloy, it can be recovered from the salt phase, for instance, by the addition of a magnesium-aluminum alloy or zinc-magnesium alloy, whereby the plutonium halide is reduced to the metal and taken up by the excess metal of the added alloy. The alloy thus recovered can then be concentrated as to plutonium by evaporation of the zinc or magnesium excess. This recovery of the plutonium from the salt phase is no part of the invention.

While the process of this invention has been described for the processing of neutron-irradiated fission-product-containing fuel elements or fuel materials, it can also be applied to the recovery of uranium and reconditioning of the alloys of nonirradiated fuel elements in which flaws have been discovered by inspection. Likewise, although the process has been primarily explained using potassium halide and potassium double halide, it will be understood that sodium halide and sodium double halides are equally suitable.

Instead of carrying out only one "extraction" step, the extractants, either salt or metal, can be added in a series of small batches just as it is frequently done in liquid-solvent extraction processes; of course, then a phase separation step has to be carried out between each extraction step. This extraction is installments brings about still further improvement of separation.

In the following, a number of examples are given to illustrate the process of this invention.

EXAMPLE I

Eleven runs were carried out; in each about the same amount of aluminum halide-potassium halide mixture was equilibrated with about identical amounts of uranium-aluminum alloy of the same composition at about 725° C. in a vacuum. While for runs 1-8 the aluminum halide and potassium halide were the chlorides, runs 9-11 used the bromides.

After equilibration, the test tubes containing a metal phase and a salt phase were plunged into water to quench the content and halt the reaction. The salt and metal phases were then separated mechanically, dissolved in water and acid, respectively, diluted to volume and analyzed. The ratio of aluminum ions and potassium ions in the salt mixture used and the distribution coefficient of uranium, "DU"

$$\left(\frac{\text{Grams of uranium per gram of metal}}{\text{Grams of uranium per gram of salt}}\right)$$

are compiled in Table I.

Table I

| Run No. | Moles Al$^{+++}$ / Moles K$^+$ | DU |
|---|---|---|
| 1 | 1.00 | 37.0 |
| 2 | 0.95 | 25.1 |
| 3 | 0.89 | 17.1 |
| 4 | 0.79 | 4.7 |
| 5 | 0.69 | 2.6 |
| 6 | 0.59 | 1.6 |
| 7 | 0.48 | 1.0 |
| 8 | 0.39 | 0.7 |
| 9 | 0.44 | 0.081 |
| 10 | 0.47 | 0.063 |
| 11 | 0.20 | 0.057 |

It is obvious from the above results that the smaller the ratio of aluminum halide to potassium halide was, the smaller a distribution coefficient was obtained. This clearly shows that an excess of potassium halide yields by far superior results when it is desired to extract uranium into the salt phase. The table furthermore illustrates clearly that the bromides are radically superior to the chlorides, very little uranium entering the metal phase in the dissolution step with the bromide mixture (runs 9-11).

EXAMPLE II

Three runs were carried out identically to those described in Example I, using potassium bromide and aluminum chloride for the dissolution step. The salt phase obtained in each instance was subjected to further treatment, namely to reduction. For this purpose, aluminum chloride was first added to the salt phase to bring the ratio of Al$^{+++}$:K$^+$ to equimolarity. Thereafter, aluminum metal was admixed to the molten salt in an excess quantity. Phase separation was again carried out, and each phase was analyzed as in Example I. The mole ratio of aluminum halide:potassium halide after the addition of aluminum chloride for each run and the distribution coefficient obtained are compiled in Table II.

Table II

| Run No. | Moles Al$^{+++}$ / Moles K$^+$ | DU |
|---|---|---|
| 1 | 1.00 | 25.3 |
| 2 | 1.04 | 15.4 |
| 3 | 0.99 | 16.1 |

The above results clearly demonstrate that the uranium was almost quantitatively reduced and transferred to the aluminum phase. Repetition of the reduction procedure, of course, would still further improve the separation factor.

EXAMPLE III

A 100-gram sample of an alloy containing substantially 90% by weight of aluminum 10% by weight of uranium small amounts of fission products, some electronegative and some electropostive with respect to aluminum, is processed to obtain a reconstituted alloy of the same composition, but substantially free of fission products.

To this alloy there are added 80.5 grams of a mixture of aluminum bromide and potassium bromide, in a mole ratio of 0.20. This mixture is heated to about 725° C. and held at this temperature for about ½ hour. Two phases are formed: an aluminum metal phase containing fission products electronegative to aluminum, e.g., zirconium, niobium, ruthenium, palladium, tellurium, and a salt phase containing the uranium and the fission products electropositive to aluminum, e.g., the rare earths, strontium, and cesium. The phases are separated from each other and the metal phase is discarded.

The mole ratio of aluminum halide to potassium halide in the salt phase is then brought to 1.00 by adding to it 49.6 grams of $AlCl_3$. This yields a total of 130.1 grams of aluminum-potassium halide salt mixture; it contains 9.46 grams of the uranium.

To this mixture 80.5 grams of aluminum metal are then added, and the mixture is again heated at 725° C. for about ½ hour. The salt phase and the metal phase are then separated. An aluminum-uranium alloy having a total weight of 89 grams and containing about 9 grams of uranium, only slightly contaminated by fission products, is obtained. The fission products electropositive relative to aluminum are largely retained in the salt phase.

There is thus an 89% recovery of the uranium in the form of an alloy which is suitable for refabrication.

EXAMPLE IV

An 11.85-gram sample of an aluminum-uranium alloy containing 3.2244 grams of uranium$^{238}$ (as a stand-in for uranium$^{235}$) was introduced into a molten mixture, at about 750° C., of $AlBr_3$ and KBr present in a mole ratio of 0.20. After 20 minutes the metal and salt phases were separated from each other and analyzed for their respective uranium contents. The metal was found to contain 1.1000 grams of uranium and the salt phase 2.0402 grams; about 63% of the total uranium present had thus been extracted into the salt phase.

Aluminum chloride was then added to the major portion of the salt phase (total uranium content: 1.9610 grams) in a quantity to bring the molar ratio of $AlBr_3+AlCl_3$ to KBr to 1.11; 15.3 grams of aluminum were also added. The equilibration temperature was again 750° C., and contact was maintained for 30 minutes. Again, the salt and metal phases were separated and analyzed for uranium. The metal phase weighed 16.76 grams and contained 10.2 w/o of uranium. Thus 1.71 grams or 87.2% of the uranium in the salt phase had been reduced and extracted into the aluminum.

It will be understood that this invention is not to be limited to the details given herein but that it may be modified within the scope of the appended claims.

What is claimed is:

1. A process of recovering uranium from a neutron-bombarded uranium-aluminum alloy containing fission products electropositive to aluminum and fission products electronegative to aluminum, said process comprising dissolving said alloy in a molten mixture of aluminum halide and alkali metal halide, in which said halides are selected from the group consisting of bromides and chlorides, the molar ratio of aluminum halide:alkali metal halide ranges between 0.1 and 0.5 and the aluminum halide is present in an about stoichiometric quantity with respect to the uranium and fission products to be halogenated, whereby a metal phase containing the aluminum metal and fission products electronegative with respect to aluminum and a salt phase containing fission products electropositive as to aluminum and alkali metal-uranium halide are formed; separating said metal phase from said salt phase; adding more of said aluminum halide to the salt phase to bring the amount of aluminum halide to about equimolarity with regard to the alkali metal halide present; adding aluminum metal to the molten salt phase in a quantity that is several times as great as that stoichiometrically required for the reduction of the uranium halide present, whereby aluminum halide and uranium metal are formed and the uranium metal is alloyed with the excess aluminum, while the halides of the electropositive fission products remain as such in the salt phase; and separating the salt from the alloy formed.

2. The process of claim 1 wherein the temperature for both dissolution and reduction steps ranges between 600 and 1000° C.

3. The process of claim 3 wherein the temperature ranges between 700 and 750° C.

4. The process of claim 1 wherein the salt phase, after adjustment to about equimolarity, has a ratio of between 0.8 and 1.2 for the aluminum halide:potassium halide.

5. The process of claim 5 wherein the about equimolar ratio ranges between 0.8 and 1.

6. The process of claim 1 wherein the alkali metal halide is the chloride.

7. The process of claim 1 wherein the alkali metal halide is the bromide.

8. The process of claim 1 wherein the aluminum halide is the chloride.

9. The process of claim 1 wherein the aluminum halide is the bromide.

10. The process of claim 1 wherein the molten mixture is a bromide mixture and the aluminum halide added to the salt phase is the chloride.

11. The process of claim 1 wherein both dissolution and reduction are carried out under the exclusion of oxygen.

12. A process of recovering uranium from a neutron-bombarded uranium-aluminum alloy containing fission products electropositive to aluminum, fission products electronegative to aluminum and plutonium, said process comprising dissolving said alloy in a molten mixture of aluminum halide and alkali metal halide, in which said halides are selected from the group consisting of bromides and chlorides, the molar ratio of aluminum halide:alkali metal halide ranges between 0.1 and 0.5 is present in an about stoichiometric quantity with respect to the uranium, plutonium and fission products to be halogenated, whereby a metal phase containing the aluminum metal and fission products electronegative with respect to aluminum and a salt phase containing fission products electropositive as to aluminum, plutonium trihalide and alkali metal-uranium halide are formed; separating said metal phase from said salt phase; adding more of said aluminum halide to the salt phase to bring the amount of aluminum halide to about equimolarity with regard to the alkali metal halide present; adding aluminum metal to the molten salt phase in a quantity that is several times as great as that stoichiometrically required for the reduction of the uranium halide present, whereby aluminum halide and uranium metal are formed and the uranium metal is alloyed with the excess aluminum, while the halides of the electropositive fission products and plutonium remain as such in the salt phase; and separating the salt from the alloy formed.

13. A process of recovering uranium from a uranium-aluminum alloy, comprising dissolving said alloy in a molten mixture of aluminum halide and alkali metal halide, wherein the halide is selected from the group consisting of bromides and chlorides, the molar ratio of aluminum halide:alkali metal halide ranges between 0.1 and 0.5 is present in an about stoichiometric quantity for halogenation of the uranium whereby a uranium-alkali metal halide is formed and dissolved in said halide mixture as a salt phase; separating the aluminum metal from said salt phase; adding more of said aluminum halide to the salt phase to bring the amount of aluminum halide to about equimolarity with regard to the alkali metal halide present; adding aluminum metal to the molten salt phase in a quantity that is several times as great as that stoichiometrically required for the reduction of the uranium halide present, whereby aluminum halide and uranium metal are formed and the uranium metal is alloyed with the excess aluminum; and separating the salt from the alloy formed.

14. A process of recovering uranium from a neutron-bombarded uranium-aluminum alloy containing fission products electropositive to aluminum and fission products electronegative to aluminum, said process comprising dissolving said alloy, at about 725° C. and under vacuum, in a molten mixture of aluminum bromide and alkali metal bromide of a mole ratio of 0.2 and in which the aluminum bromide is present in an about stoichiometric quantity with respect to the uranium and fission products to be brominated whereby a metal phase containing said aluminum and fission products electronegative with respect to aluminum and a salt phase containing fission products electropositive as to aluminum and alkali metal-uranium bromide are formed; separating said metal phase from said salt phase; adding aluminum chloride to the salt phase to bring the amount of aluminum halide to about equimolarity with regard to the alkali metal bromide present; adding aluminum metal to the molten salt phase in a quantity that is about ten times as great as that stoichiometrically required for the reduction of the uranium halide present, whereby aluminum halide and uranium metal are formed and the uranium metal is alloyed with the excess aluminum, while the halides of the electropositive fission products remain as such in the salt phase; and separating the salt from the alloy formed.

References Cited in the file of this patent
UNITED STATES PATENTS
2,948,586  Moore ------------------ Aug. 9, 1960

UNITED STATES PATENT OFFICE
CERTIFICATE OF CORRECTION

Patent No. 3,057,717

October 9, 1962

Raymond H. Moore

It is hereby certified that error appears in the above numbered patent requiring correction and that the said Letters Patent should read as corrected below.

Column 1, line 55, for "moldwise" read -- molarwise --; column 3, line 14, strike out ", for instance,"; column 4, line 3, for "is" read -- in --; column 5, line 8, after "aluminum" insert a comma; line 9, before "small" insert -- and --; column 6, line 23, for the claim reference numeral "3" read -- 2 --; line 28, for the claim reference numeral "5" read -- 4 --; column 6, line 52, and column 7, line 3, before "is", each occurrence, insert -- and the aluminum halide --.

Signed and sealed this 4th day of June 1963.

(SEAL)
Attest:

RNEST W. SWIDER
ttesting Officer

DAVID L. LADD
Commissioner of Patents